(12) United States Patent
Simons

(10) Patent No.: US 8,957,329 B2
(45) Date of Patent: Feb. 17, 2015

(54) LOW-PROFILE LOAD-MEASURING ATTACHMENT FOR LIFT-TRUCKS

(75) Inventor: Gerald Sidney Simons, North York (CA)

(73) Assignee: Weigh Point Incorporated, Cambridge, Ontario (CA)

( * ) Notice: Subject to any disclaimer, the term of this patent is extended or adjusted under 35 U.S.C. 154(b) by 325 days.

(21) Appl. No.: 13/637,692

(22) PCT Filed: Mar. 31, 2011

(86) PCT No.: PCT/CA2011/000333
§ 371 (c)(1),
(2), (4) Date: Sep. 27, 2012

(87) PCT Pub. No.: WO2011/120140
PCT Pub. Date: Oct. 6, 2011

(65) Prior Publication Data
US 2013/0015004 A1    Jan. 17, 2013

(30) Foreign Application Priority Data
Apr. 1, 2010   (GB) .................................. 1005643.0

(51) Int. Cl.
| | | |
|---|---|---|
| *G01G 19/08* | (2006.01) | |
| *B66C 1/40* | (2006.01) | |
| *B66F 9/075* | (2006.01) | |
| *B66F 17/00* | (2006.01) | |
| *B62B 3/06* | (2006.01) | |

(52) U.S. Cl.
CPC ................ *B66F 17/003* (2013.01); *B62B 3/06* (2013.01); *G01G 19/083* (2013.01); *B62B 2203/50* (2013.01)

USPC .................... 177/137; 414/21; 73/862.541

(58) Field of Classification Search
CPC .... G01G 19/083; B62B 2203/50; B62B 3/06; B66F 17/003
USPC ............... 177/136–141; 414/21; 73/862.636, 73/862.541
See application file for complete search history.

(56) References Cited

U.S. PATENT DOCUMENTS

| | | | | |
|---|---|---|---|---|
| 2,935,213 | A | 5/1960 | Cellitti et al. | |
| 3,059,710 | A * | 10/1962 | Pien ................................ | 177/136 |
| 3,063,576 | A * | 11/1962 | Hofmeister .................... | 414/21 |
| 4,420,053 | A * | 12/1983 | Russo ............................ | 177/139 |
| 4,666,004 | A * | 5/1987 | Raz ................................ | 177/139 |
| 4,854,406 | A * | 8/1989 | Appleton et al. ............. | 177/139 |
| 4,899,840 | A | 2/1990 | Boubille | |
| 5,922,998 | A * | 7/1999 | Zefira ............................ | 177/139 |
| 5,986,560 | A | 11/1999 | Rayburn ....................... | 340/685 |
| 6,730,861 | B1* | 5/2004 | Simons ......................... | 177/136 |
| 6,855,894 | B1* | 2/2005 | Van Seumeren ............. | 177/130 |
| 7,659,484 | B2* | 2/2010 | Kroll ............................. | 177/130 |
| 7,669,486 | B2* | 3/2010 | Simons .................... | 73/862.636 |
| 2003/0234122 | A1 | 12/2003 | Kroll et al. | |
| 2007/0041820 | A1* | 2/2007 | Simons ......................... | 414/647 |
| 2008/0178690 | A1* | 7/2008 | Simons ................... | 73/862.541 |
| 2011/0067502 | A1* | 3/2011 | Simons ................... | 73/862.045 |

FOREIGN PATENT DOCUMENTS

| | | |
|---|---|---|
| DE | 4442288 | 11/1994 |
| WO | WO2009/143613 | 12/2009 |

* cited by examiner

*Primary Examiner* — Randy W Gibson
(74) *Attorney, Agent, or Firm* — Anthony Asquith Corp.

(57) ABSTRACT

For minimizing the height of the load-measuring attachment for a lift-truck, the cover is made of thin sheet metal. The side-walls of the channel-section of the cover are folded into double thickness, to stabilize the side-walls of the cover.

12 Claims, 4 Drawing Sheets

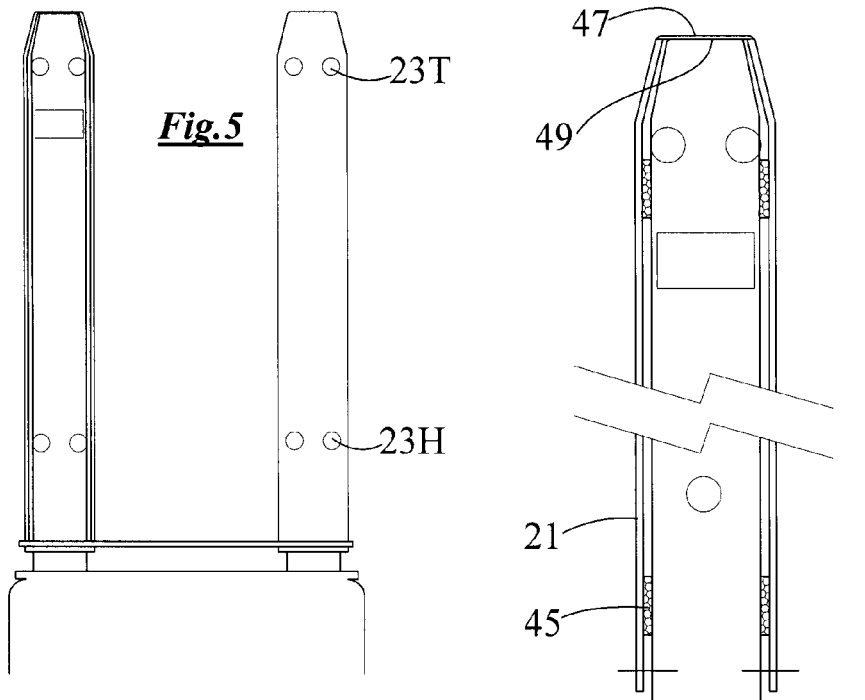
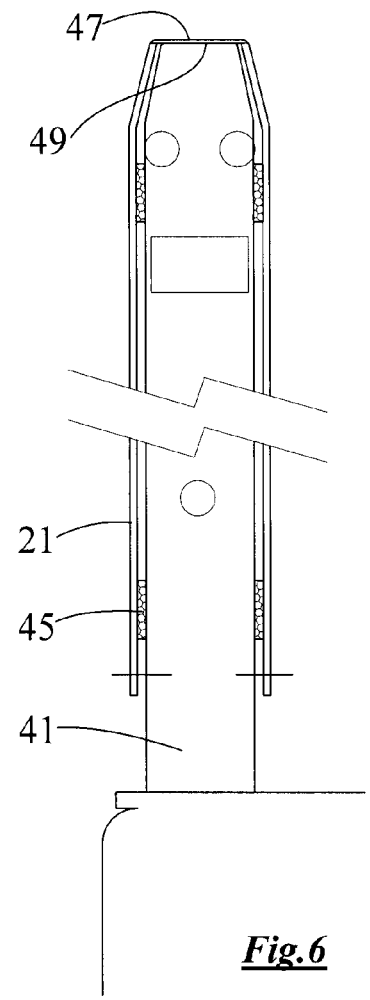
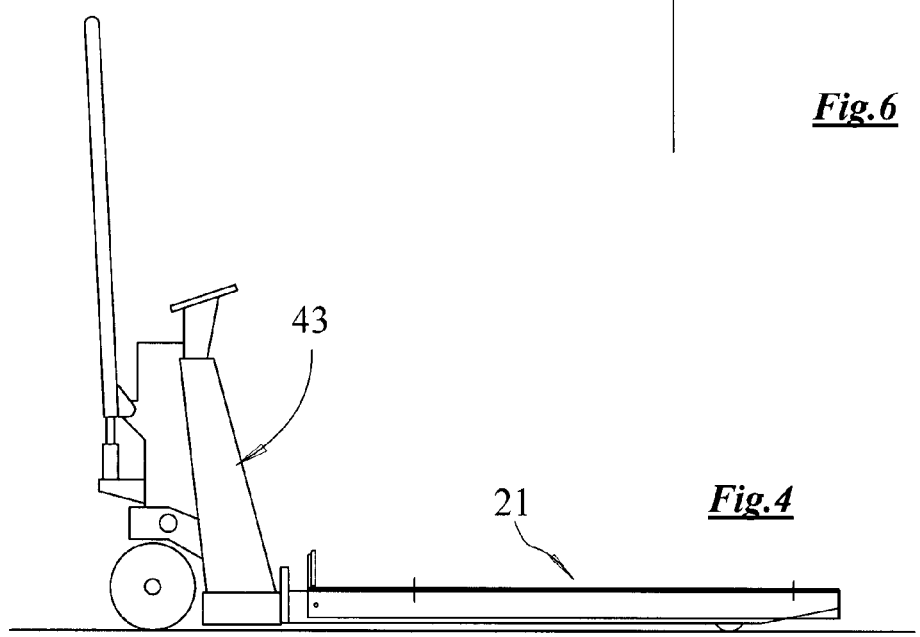

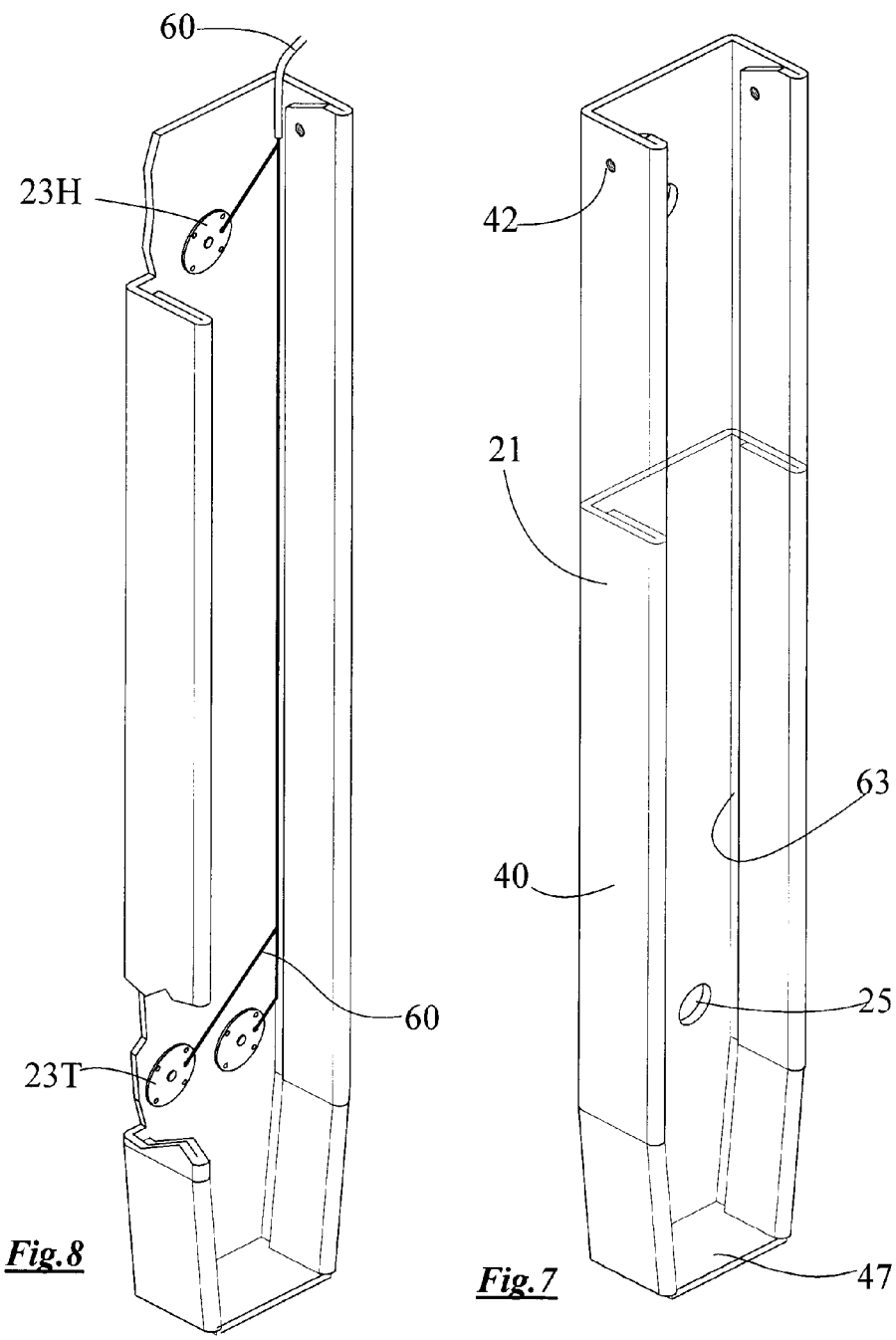

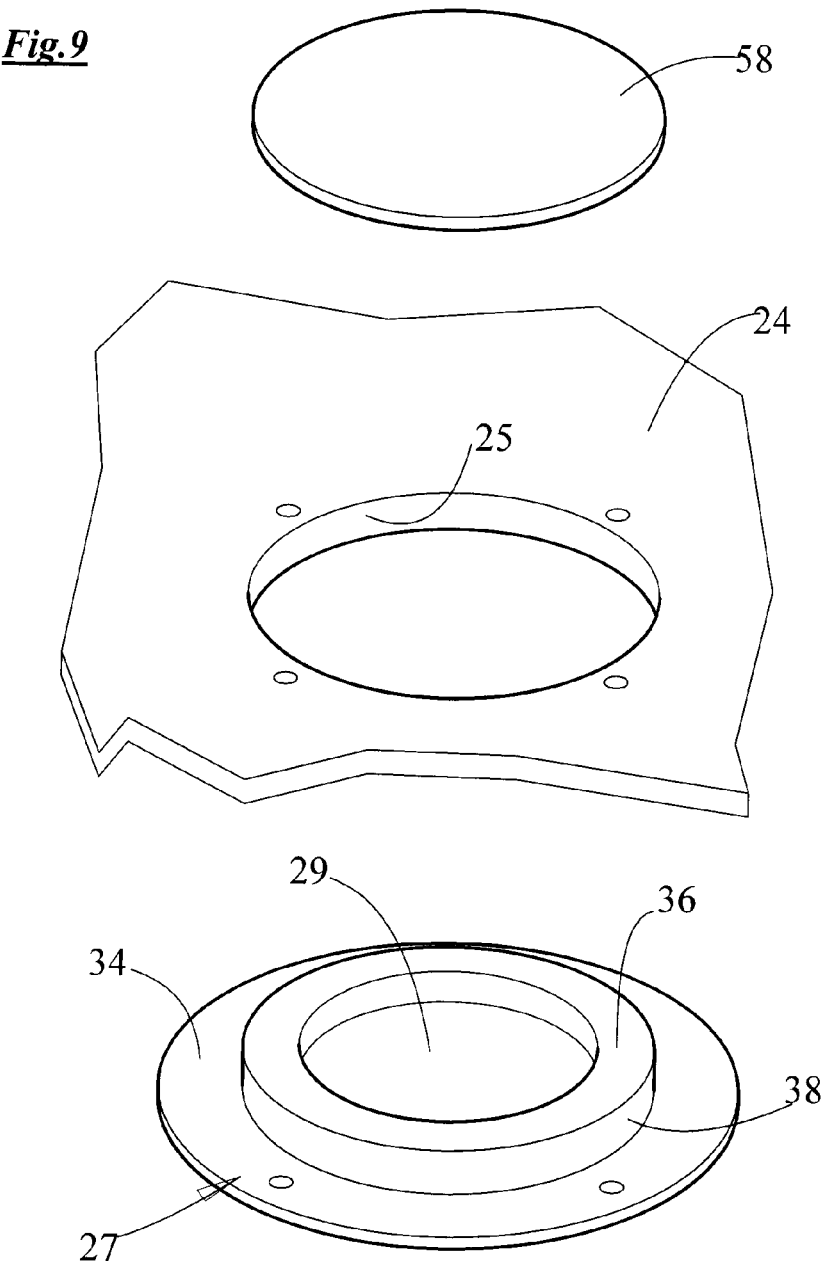

LOW-PROFILE LOAD-MEASURING ATTACHMENT FOR LIFT-TRUCKS

This invention relates to a loadcell system, of the kind used to indicate the weight of a load resting on the load-platform (herein termed the forks) of a pallet-truck (motorized or manual), fork-lift truck, and the like, herein collectively termed lift-trucks. The system is especially applicable in the case of an add-on loadcell weight-measurement system, i.e a system that can be added to the lift-truck as a post-purchase installation.

Attention is directed to patent publication WO-2009/143613. This present specification is concerned with a development to the technology disclosed therein.

FIGS. 6,7,8 of the said WO-2009/143613 are a plan view, a front view, and a side-view of a pallet walkie-truck. There, fork-covers have been placed over the forks of the lift-truck. The fork-covers carry loadcells, for measuring and indicating the weight of a load carried by the forks, the load resting directly on the fork-covers. The left and right fork-covers are joined at their back ends by a cross-bar.

Except as indicated herein, the apparatus and the layout of the components are the same, in the examples described herein, as in the apparatus depicted in the said FIGS. 6,7,8.

One of the problems, when adding a capability to measure a load resting on the forks of an existing lift-truck, is the lack of available space above the forks. The lift-truck was designed to enable the forks to be entered into the fork-receiving fork-pockets of a standard pallet; the designers of the lift-truck were motivated to provide such clearance as would ensure the fork would enter the fork-pocket of a standard pallet, but they were not motivated to leave a large allowance to accommodate a cover that might later be placed over the fork. That is to say: so long as the fork could actually enter the pocket, the designers did not provide a large clearance between the upper surface of the fork and the top of the fork-pocket. The space available above the upper surface of the fork, within which the load-measuring cover must be accommodated, therefore, is, or might be, severely limited.

Consequently, it might happen that, when a load-measuring cover is placed on top of the fork, and the combined cover-plus-fork enters the fork-pocket, the cover might actually touch the top of the fork-pocket of the pallet. The operators should therefore check the engagement of the combined cover-plus-forks in the fork-pocket. If there is a problem, certain adjustments can be made, for example to the height of the forks above the ground. The fact that some adjustments can be made does not, however, solve the problem of the lack of vertical space for the cover. The lower the height profile of the add-on fork-cover, the more likely it is that the cover-plus-fork combination can be made to engage smoothly into the fork-pocket.

Designers of add-on load-measuring systems are beset by the problem of fitting the cover, and its associated load-cells, into the constricted vertical space. Typically, in traditional add-on load-measuring covers, having loadcells, a portion of the loadcell had to be let into the fork itself—which, usually, is disadvantageous and contra-indicated.

It is an aim of the new technology as described herein to provide a load-measuring cover, which fits over the fork of a lift-truck, in which the height is minimized, at which the upper-surface of the cover resides above the upper-surface of the fork. As a general preference, the top surface of the fork-cover preferably should not be higher than the top surface of the fork by an added height of more than eight millimetres. More preferably, the added height should be no more than five or six mm.

SOME FEATURES OF THE INVENTION

In the new technology as described herein, as with traditional covers, the cover is configured as an inverted channel, with a roof and side-walls, which is sized to fit over the fork of the lift-truck. But the new cover is made of very thin sheet metal. Typically, where the conventional cover is of five or six mm sheet metal, the new cover is of 3.5 mm sheet metal. Combined with very thin load-cells, e.g of the design as shown in WO-2009/143613, the cover with the loadcells attached can simply rest on top of the fork, and no provision need be made for letting the loadcells, or a portion of the loadcells, into the material of the fork itself.

The cover being of thin sheet metal, it might be feared that, when a heavy load is placed on top of the cover, the roof of the cover might sag, and that the roof might sag so much that the undersurface of the roof of the cover comes into touching contact with the oversurface of the fork.

It is important, of course, for accurate load-measurement, that all of the load must pass through the loadcells—if a portion of the load were to become supported by contact between the cover and the fork, that part of the load would not be measured by the loadcells.

It is recognized that, despite the use of thin sheet metal in the cover, the cover can be made stiff enough not to sag, by increasing the thickness of the side-walls of the channel section. Preferably, this can be done by folding the thin sheet metal in such manner as to form a double thickness side-wall.

DETAILED DESCRIPTION OF PREFERRED EMBODIMENTS

The new technology will now be further described with reference to the accompanying drawings, in which:

FIG. 4 is a side-view of a manual lift-truck, having the forks shown in FIG. 1.

FIG. 5 is a plan-view of the lift-truck, in which the roof of the fork-cover on the left fork has been removed.

FIG. 6 is a close-up of part of FIG. 5.

FIG. 7 is a pictorial view of one of the covers, without load-cells. (FIG. 7 includes a ghost view of the cross-sectional profile of the fork-cover.)

FIG. 8 is the same view as FIG. 7, except that loadcells have been added to the cover.

FIG. 9 is an exploded view, showing the cover with a through-hole, a loadcell, and a protective plug.

The scope of the patent protection sought herein is defined by the accompanying claims. The apparatuses and procedures shown in the accompanying drawings and described herein are examples.

Figure 1:
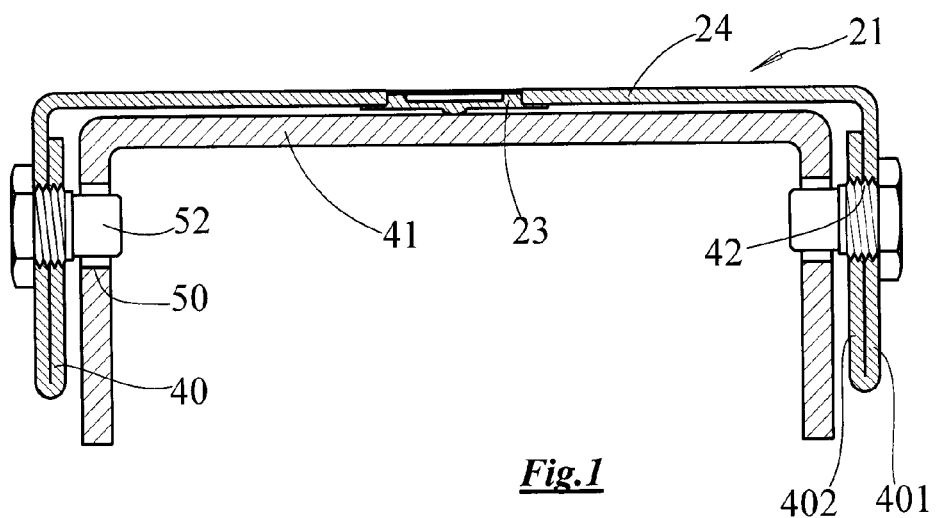
FIG. 1 is a cross-sectional end elevation of a fork of a lift-truck, upon which has been placed a fork-cover, the fork-cover having loadcells attached.

In FIG. 1 the fork-cover 21 is made of sheet material that is considerably thinner than the material of traditional fork-covers. Typically, fork-cover material has been sheet steel of about 5 mm or 6 mm thickness. In FIG. 1, the fork-cover material is sheet steel of about 3.0 or 3.5 mm thickness.

Figure 2:
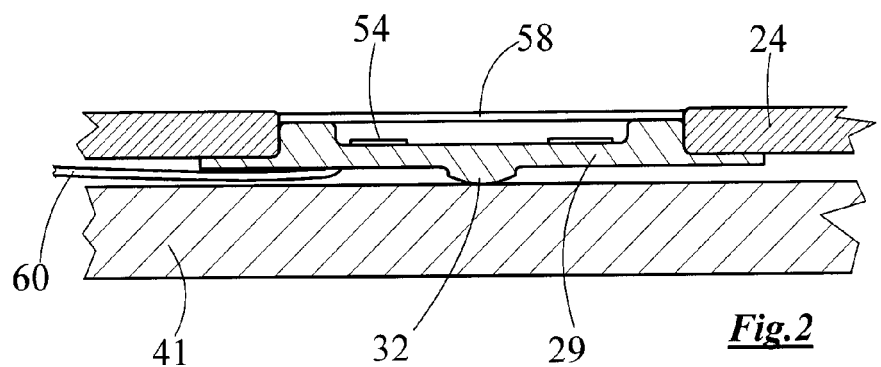
FIG. 2 is a close-up of a detail of FIG. 1, showing a loadcell.

The loadcell 23 of FIGS. 1,2 is let into a through-hole 25 formed in the roof 24 of the fork-cover 21. In FIGS. 6,7,8, there are there are three loadcells per cover (as also shown in FIG. 6 of the said WO-2009/143,613), being two toe-end loadcells 23T, and one heel-end loadcell 23H. The preference is to use four load-cells per cover, as shown in FIG. 5.

It would be possible to use just two load-cells per cover—one at the heel and one at the toe—if precautions are taken to prevent the cover from tipping. Tipping can be prevented by linking the left and right covers together, e.g optionally by means of a cross-bar 26.

The loadcell 23 includes a metal flexure-piece 27, from a lower plate 29 of which protrudes a stem 30, having a domed end 32. A flange 34 surrounds the lower plate 29. A chunky ring 36 extends upwards from the lower-plate, and an outer cylindrical surface 38 of the ring engages directly with the through-hole 25 in fork-cover 21.

The sidewalls 40 of the fork-cover 21 are doubled over, or folded, as shown, to improve the strength and stiffness, and resistance to sagging, of the fork-cover 21. The doubled-over fold creates an outer-side 40/1 and a folded-under portion 40/2 of the side-wall 40.

Towards the rear of the cover 21, the left and right folded sidewalls of the cover 21 are provided with respective cover-pivot-holes 42. The holes 42 are made through the double thickness of the sheet metal of the sidewalls. Each cover has respective cover-pivot-holes 42 in the left and right side-walls 40, the holes being co-axial. The cover-pivot-holes are located near the heel-ends of the covers.

The fork-covers 21 and the associated loadcells 23 may be sold as a service-kit, and may be assembled over and to the existing forks 41 of a lift-truck 43. First, the two covers, with the respective loadcells 23 factory-installed thereon, are placed over the forks 41. Spacers 45 are provided (FIG. 6), to ensure that the left and right fork-covers 21 lie squarely and symmetrically and centrally over the left and right forks 41.

The spacers 45 may take the form of e.g elastomeric buttons or pads, which are adhered at intervals to the inside faces of the folded sidewalls 40, whereby the folded sidewalls of the covers are evenly spaced and located with respect to the respective forks. No spacers are provided between the oversurface of the fork 41 and the undersurface of the roof 24 of the cover 21: the cover rests with the dome-ends 32 of the loadcells 21 resting on the oversurface of the fork 41.

The installer then makes sure that the front wall 47 of the fork-cover 21 is hard up against the toe-end 49 of the fork 41. Now, the fork-cover 21 is residing in its desired operational position, and in particular, the cover-pivot-holes 42 in the sidewalls 40 of the cover 21 are in their correct location relative to the sides of the fork 41.

Now, using the cover-pivot-holes 42 in the sidewalls 40 as a template, the installer marks the location of the centres of the cover-pivot-holes on the respective sides of the forks. That is to say, the installer marks one centre each on the four sides of the two forks.

The fork-covers 21 are removed, and the installer drills fork-pivot-holes into the material of the forks 41.

The covers 21 are then replaced, and threaded pivot-pins 52 are inserted into the cover-pivot-holes 42 in the sidewalls 40 of the covers 21. The pins 52 extend inwards, and engage the fork-pivot-holes that have just been drilled in the sides of the forks 41. The pins 52 are tightened with respect to the threaded cover-pivot-holes in the covers, but the inwardly projecting ends of the pins 52 are loose inside the fork-pivot-holes in the fork.

It will be understood that four pivot-pins are provided, i.e two pivot-pins per fork, as shown in FIG. 1. When the left and right covers are joined by means of the cross-bar 26, only one pivot-pin per fork need be provided.

The function of the pivot-pins 52 is to retain the covers 21 on the forks 41, during transport operations of the lift-truck 43, but yet to enable the covers to float freely with respect to the forks at the moment when a load measurement is being taken. It should be noted that the pins 52 support and retain the covers against all forces tending to move the covers relative to the fork, apart from forces applied directly to the front of the fork. These latter forces are by far the largest forces involved, and are often the subject of abusive impacts. These impacts are supported by the engagement of the sturdy front wall 47 of the cover 21 with the solid toe-end 49 of the fork.

Figure 3:
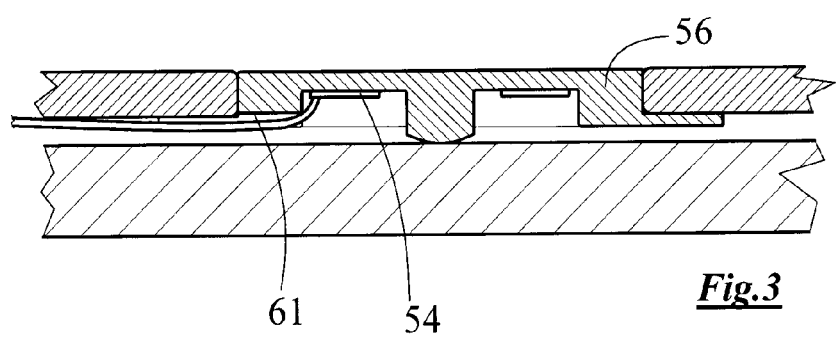
FIG. 3 is the same view as FIG. 2, showing an alternative loadcell.

The loadcell unit 56 of FIG. 3 is inverted relative to that shown in FIG. 2. FIG. 3 shows some further measures which can be taken by a designer seeking to reduce the headroom required by the installation, to a minimum.

In FIG. 2, the strain-gauges 54 in the loadcell faced upwards, and therefore they had to be protected. That protection is provided by a metal disc or plug 58 inserted into the formed hole 25 in the roof 24 of the cover 21. In FIG. 3, the strain-gauges 54 in the loadcell 56 are cemented to the underside of the flexure-piece of the loadcell 56, and therefore face downwards, and no plug is required.

Also, in FIG. 3, the connecting wires 60 from the strain-gauges are shown passing out from the loadcell 56 though a cut-out or relief 61 in the flange 34 of the loadcell 56. Thus the thickness of the wires is accommodated within the thickness of the flange 34, rather than being added to it, as was the case in FIG. 2.

As shown in FIG. 8, the connecting wires 60 should traverse, from the loadcells, laterally out to the sides of the fork-cover, and from there, along the sides of the cover, to a bridge circuit which is located in the body of the lift-truck 43.

The wires 60 should not be located between the undersurface of the cover and the oversurface of the fork except in the immediate vicinity of the loadcells, as shown in FIG. 8. If the roof of the cover were to deflect by sagging, under a load, and if the wires were to be present underneath the sag of the roof, that would shorten the amount of sag that could be accommodated. If the roof were to sag to the extent that the wires became pinched between the roof and the fork, a portion of the load would then be supported on the wires—which would negate the accuracy of the load measurement, and also might damage the wires.

Preferably, the folded side-walls are configured in such manner as to leave a recess 63 that extends lengthwise along the cover, and the wires from the load-cells are led out along this recess. Thus, the wires cannot be pinched between the cover and the fork, and also the wires are tucked away and well-protected generally.

The thin sheet metal from which the cover 21 is formed should be less than four millimetres, and preferably, should be 3 mm or 3.5 mm. When the sidewalls of the cover are formed by bending and folding, as shown, the thickness of the sidewalls is double that of the roof. The preference is that the sidewalls should be six mm or more in thickness.

It is important that the vertical height of the loadcell should be minimized—or rather, that the distance the loadcell protrudes below the undersurface of the cover should be minimized. The thickness of the flange can be as thin as 0.6 mm, but the preference is that the flange should be less than 1.5 mm. The domed-end 32 of the stem 30 of the loadcell preferably should protrude no more than three mm from the undersurface of the cover.

It will be understood that, using the technology described herein, even though the cover and the loadcells simply rest on the fork without any need for cavities or holes to be cut in the forks, still the oversurface of the cover can be as little as 5 mm or 6 mm above the oversurface of the forks. At this, it can be expected that the forks, with the covers in place, will encounter little difficulty entering the fork-pockets of standard pallets.

The numerals used in the accompanying drawings can be summarized as:
21 fork-cover
23 loadcell
23T loadcell at toe-end of fork
23H loadcell at heel end
24 roof of cover
25 through-hole in roof
26 crossbar linking left and right covers
27 flexure-piece of loadcell
29 lower-plate of flexure-piece
30 stem of loadcell
32 domed end of stem
34 flange of loadcell
36 chunky ring of loadcell
38 outer cylindrical surface of ring
40 sidewall of fork cover
41 fork
42 cover-pivot-hole
43 lift-truck
45 positioning spacers
47 front wall of fork-cover
49 toe-end of fork 41
50 fork-pivot-hole
52 threaded pivot-pin
54 strain-gauge
56 loadcell of FIG. 3
58 plug or disc
60 connecting wires from loadcell
61 relief or cut-out in flange
63 recess for wires, within sidewall

The invention claimed is:

1. Weight-measuring apparatus for a lift-truck, wherein:
the apparatus includes a cover;
the cover is configured to fit over a fork of the lift-truck;
the cover has a cross-sectional configuration that is basically inverted channel-shaped, having a roof and left and right side-walls;
the apparatus includes loadcells;
the loadcells are attached to the roof of the cover;
the cover and the loadcells are so arranged that, when the cover is placed over the fork:
(a) the loadcells rest on the fork, and the cover rests on the loadcells;
(b) whereby the weight of a load placed on the roof of the cover is transmitted through the loadcells to the fork;
the loadcells include respective load-sensors, which are structured to supply a signal that is proportional to the magnitude of the weight of the load; and
the side-walls of the cover are substantially thicker than the roof of the cover.

2. As in claim 1, wherein:
the roof of the cover is thin, having a thickness of four millimeters or less; and
the side-walls of the cover are thick, in that the side-walls have a thickness of six millimeters or more.

3. As in claim 1, wherein:
the loadcells include a toe-loadcell and a heel-loadcell;
the toe-loadcell lies a distance D-toe cm, and the heel-loadcell lies a distance D-heel cm, from the toe-end of the cover;
points P-toe-left, P-toe-right are points on the left and right side-walls, respectively, that lie a distance D-toe from the toe-end of the cover;
points P-heel-left, P-heel-right are points on the left and right side-walls, respectively, that lie a distance D-heel from the toe-end of the cover;
the left side-wall of the cover is thick over a continuous length that is at least eighty percent of the length of the left side-wall between the points P-toe-left and P-heel-left; and
the right side-wall of the cover is thick over a continuous length that is at least eighty percent of the length of the right side-wall between the points P-toe-right and P-heel-right.

4. As in claim 1, wherein the sidewalls are thick over substantially their whole length.

5. As in claim 1, wherein:
the side-walls are thick at or near the bottom edge of the side-walls, and the thickness extends upwards from the bottom-edge to a height H-thick cm above the bottom-edge; and
the height H-thick is one centimeter or more.

6. As in claim 5, wherein the height H-thick is shorter than the full height of the side-wall.

7. As in claim 1, wherein the thickness of the side-walls is double the thickness of the roof.

8. As in claim 7, wherein:
the cover is of thin sheet metal;
the thin sheet metal is formed into a channel-section, having a base and sides;
in respect of both sides:
(a) the side of the channel-section is so bent and folded as to create an outer-side and a folded-under portion;
(b) the side is so folded that the folded-under portion lies flat against the outer-side;
(c) the fold between the outer-side and the folded-under portion forms the bottom edge of the thick side-wall;
the base forms the roof, and the folded sides form the side-walls, of the cover.

9. As in claim 8, wherein, in respect of both sides, the folded-under portion lies on the inside of the channel-section, relative to the outer-side.

10. As in claim 9, wherein:
the folded-under portion is of a shorter height than the outer-side;
whereby a recess is created between a top surface of the folded-under portion, an inside surface of the outer-side, and an undersurface of the roof;
the recess runs lengthwise along the cover; and
signal wires from the loadcells run inside the recess, lengthwise along the cover.

11. As in claim 1, wherein:
through-holes are formed in the roof of the cover, and complementary surfaces on the loadcells fit tightly in the through-holes;
respective protruding-portions of the loadcells protrude downwards from the through-holes in the cover;
the protruding-portions protrude a height H-cell millimeters down from the undersurface of the roof of the cover;
the loadcell is of a low-profile configuration, in that H-cell is four mm or less.

12. An apparatus of claim 1, in combination with a fork of a lift-truck, wherein:
the fork has a front-face and the cover has a front-wall;
the apparatus includes a pivot-pin, which is fixed into one of the fork-pivot-hole or the cover-pivot-hole, termed the fixed-hole;
the pivot-pin is a large-clearance fit into the other of the fork-pivot-hole or the cover-pivot-hole, termed the loose-hole;
the clearance is large enough that, when the cover is resting on the fork and is pressed hard against the front of the fork, an inside-surface of the front-wall of the cover contacts a front-surface of the front-face at a front-contact-point, no part of the pivot-pin touches the wall of the loose-hole.

* * * * *